(12) United States Patent
Liu

(10) Patent No.: US 7,034,417 B1
(45) Date of Patent: Apr. 25, 2006

(54) ROTOR ASSEMBLY CAPABLE OF DISSIPATING HEAT

(75) Inventor: Wen-Hao Liu, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/014,975

(22) Filed: Dec. 20, 2004

(51) Int. Cl.
*H02K 9/06* (2006.01)

(52) U.S. Cl. ............ 310/60 A; 310/60 R; 310/61

(58) Field of Classification Search ........... 310/58–59, 310/60 R, 61, 60 A; 416/3, 10, 170 R, 244 R, 416/245, 353, 354, 423.1, 423.12, 423.7
See application file for complete search history.

(56) References Cited

U.S. PATENT DOCUMENTS

| | | | | |
|---|---|---|---|---|
| 3,666,978 A | * | 5/1972 | Renner | 310/62 |
| 4,476,405 A | * | 10/1984 | Komurasaki | 310/60 R |
| 4,492,885 A | * | 1/1985 | Kitamura et al. | 310/62 |
| 4,626,720 A | * | 12/1986 | Fukasaku et al. | 310/62 |
| 5,814,908 A | * | 9/1998 | Muszynski | 310/62 |
| 5,883,449 A | * | 3/1999 | Mehta et al. | 310/60 R |
| 6,384,494 B1 | * | 5/2002 | Avidano et al. | 310/58 |
| 6,815,849 B1 | * | 11/2004 | Serizawa et al. | 310/62 |
| 6,926,498 B1 | * | 8/2005 | Li et al. | 416/3 |

* cited by examiner

*Primary Examiner*—Tran Nguyen

(57) ABSTRACT

A rotor assembly capable of dissipating heat comprises a shied cover and a hub. The shied cover provides a closed end and an open end with a lateral wall thereof being joined to the closed end and at least a through hole being provided at the closed end. The hub provides at least a fixing part, which penetrates the through hole, such that the hub can be attached to the outer surface of the shield cover. Hence, fluid can move in and out via the through hole to enhance convection efficiency and promote heat dissipation effectively.

8 Claims, 4 Drawing Sheets

ROTOR ASSEMBLY CAPABLE OF DISSIPATING HEAT

BACKGROUND OF THE INVENTION

1. Field of the Invention

The present invention is related to a rotor assembly capable of dissipating heat and particularly to a rotor assembly, which is capable of removing heat from the rotor of a motor.

2. Brief Description of the Related Art

Referring to FIG. 1, the rotor device in a conventional fan includes a fan frame 11 and a hub 12. The fan frame 11 provides a support base 111 with a hollow axial barrel 112 and a bearing 113 is received in the axial barrel 112. A stator 13 fits with the outer surface of the axial barrel 112 such that the stator 13 can be located at the support base 111. The hub 12 has a closed end and an open end with an annular cover 14 inside. The annular cover 14 has a projection part 141 corresponding to the closed end of the hub 12 and a rotor 15 is attached to the inner lateral side of the annular cover 14. A plurality of radial fan blades 121 are formed at the outer side of the hub 12. A shaft 16 is attached to the hub 12 at an end thereof and passes through the bearing 113 at another end thereof such that the hub 12 and the annular cover 14 can movably connect with the support base 111.

However, there is a problem occurring during the preceding rotor device running. Once the stator 13 and the rotor 15 are magnetized to rotate the hub 12 and the annular cover 14 due to phase changing, the fan blades 121 are driven to move fluid for cooling heat generation parts. But, heat generated from rotation of the rotor 15 relative to the stator 13 is enclosed by the hub 12 such that most of the heat stays in the hub 12 because of low heat exchange with the outside air. As a result, not only life span of the motor is shortened but also heat in the system increases.

Further, U.S. Patent Publication No. 2004/0075356 discloses a fan rotor, which includes a hub with a closed wall and an inner wall and a metal ring attached to the inner wall and disposed in the pipe shaped hub. A magnetic ring is provided in the metal ring. The hub has a plurality of locating parts to allow the metal ring being supported in the hub.

However, the fluid in the hub moves vertically while the hub rotates and flow path of the fluid are not in accordance with the through holes provided at the hub such that it is hard for the internal fluid moving outward via the through holes, i.e., the convection efficiency is low. Further, the hub is made of plastics, which is low heat conductivity, and unable to assist natural convection between the heat inside the hub and the outside air. Under this condition, undesirable cooling is obtained and the entire heat dissipation is ineffective.

SUMMARY OF THE INVENTION

An object of the present invention is to provide a rotor assembly capable of dissipating heat, in which a shield cover provides at least a though hole with slant inner wall and a hub provides at least a fixing part for penetrate the through hole so a to engage with the shield cover, for promoting convection efficiency and enhancing heat dissipation effect due to the slant inner wall of the through hole guiding the fluid fast in and out smoothly.

Another object of the present invention is to provide a rotor assembly capable of dissipating heat, in which the shield cover exposes the top thereof to the outside air instead of being enclosed with hub to occur natural convection for cooling the rotor.

Accordingly, a rotor assembly capable of dissipating heat according to the present invention comprises a shied cover and a hub. The shied cover provides a closed end and an open end with a lateral wall thereof being joined to the closed end and at least a through hole being provided at the closed end. The hub provides at least a fixing part, which penetrates the through hole, such that the hub can be attached to the outer surface of the shield cover. Hence, fluid can move in and out via the through hole to enhance convection efficiency and promote heat dissipation effectively.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
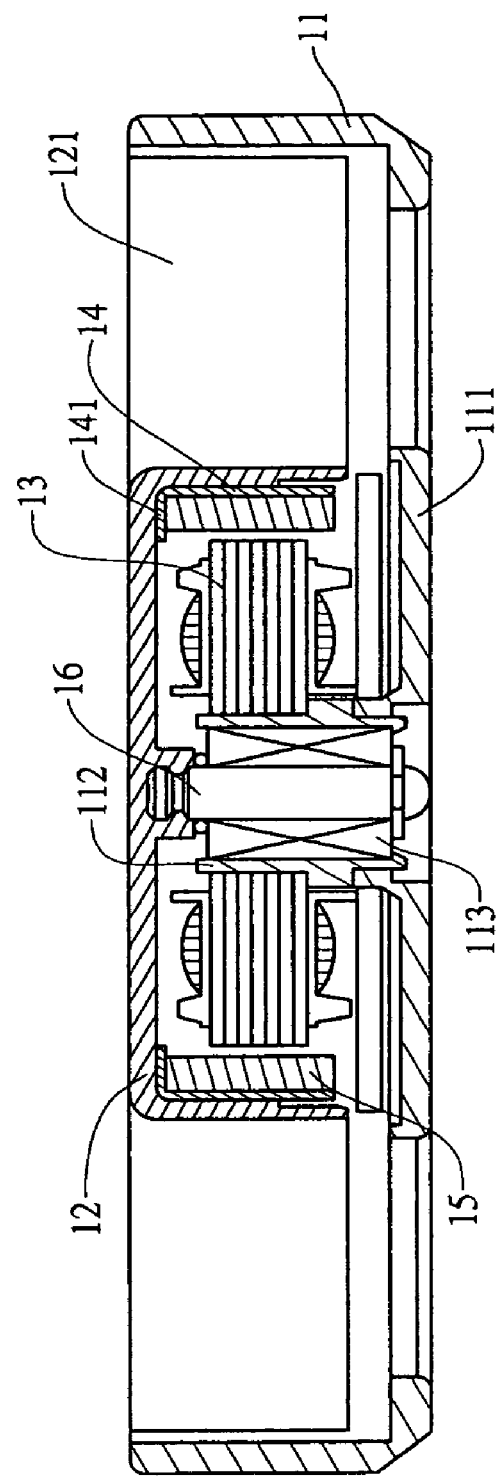
FIG. 1 is a sectional view of a conventional fan.
Figures 2, 2A:
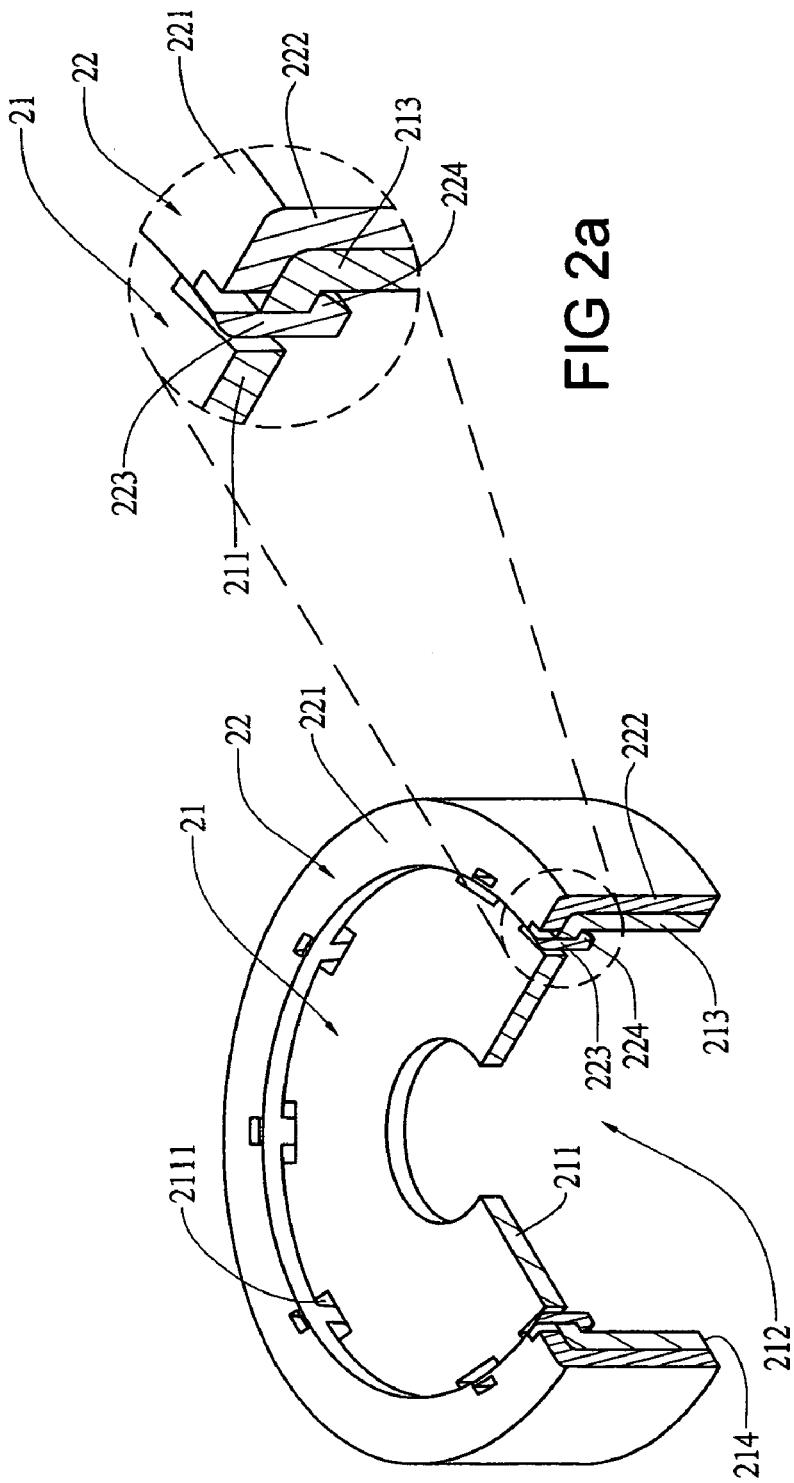
FIG. 2 is a perspective partly sectional view of the preferred embodiment of a rotor assembly device capable dissipating heat according the present invention.
FIG. 2a fragmentary perspective sectional view illustrating local enlargement of the fixing part penetrating a through hole and hook-engaging with the inner surface of a closed end on the shield casing shown in FIG. 2.
Figure 3:
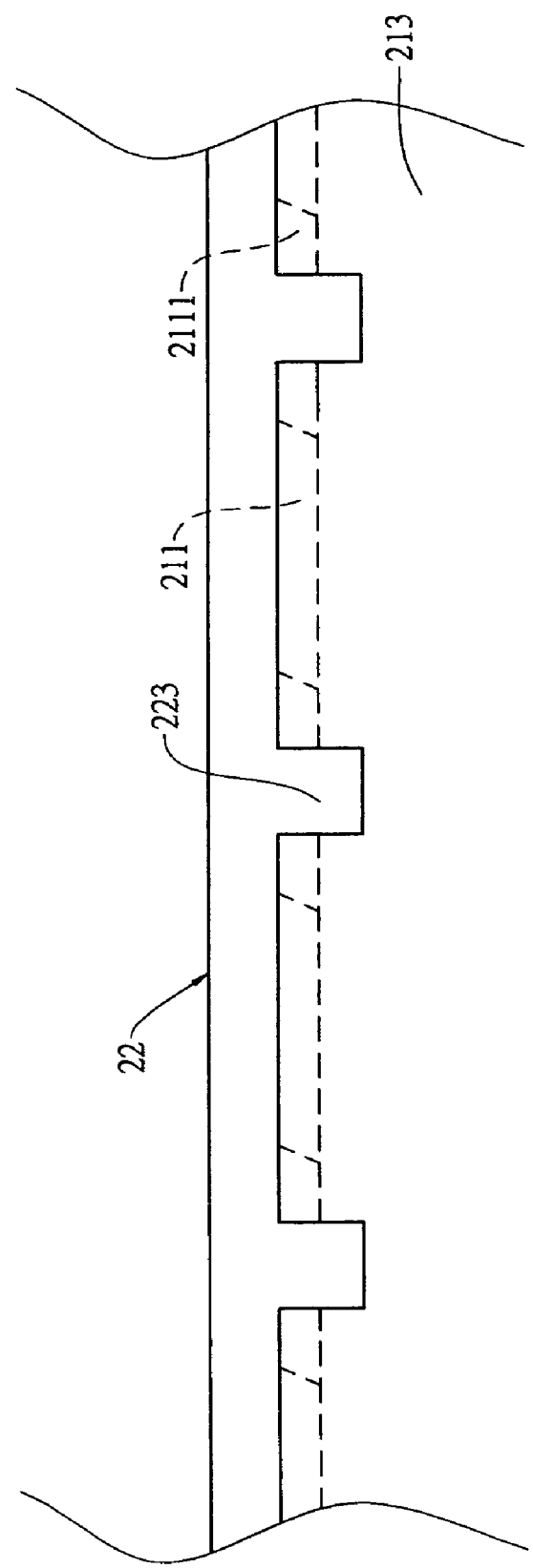
FIG. 3 is a plan view illustrating the through hole having a slanting inner wall.

Referring to FIGS. 2, 2a and 3, the preferred embodiment of a rotor assembly device capable of dissipating heat according to the present invention comprises a shield cover 21 and a hub 22. The shield cover 21 has a closed end 211, an open end 214 and a lateral wall 211 joined to the closed end 211. The closed end 211 is the top wall of the shield cover 21. A chamber 212 is defined with the closed end 211 and the lateral wall 213. The closed end 211 is provided with a plurality of through holes 2111 at the circumference thereof with each of the through holes 2111 having a slant inner wall as shown in FIG. 3. Of course, the inner wall can be straight instead of being slant. The hub 22 is annular and attached to the shield cover 21 in a way of being disposed surrounding the shield cover 21.

Wherein, the shield cover 21 is made of good heat conductive material such as metal. The hub 22 has a shoulder part 221 and a hub wall 222 extends downward from the shoulder part 221. The inner side of the shoulder part 221 provides a plurality of fixing parts 223 with a hook end 224 respectively corresponding to the through holes 2111 such that the fixing parts 223 can penetrate the through holes 2111 with the hook end 224 engaging with the inner surface of the closed end 211 respectively as shown in FIG. 2a. The hub wall 222 is closely attached with the lateral wall 213 of the shield cover 21 so that the closed end 211 exposes the outer surface thereof.

The preceding through holes 2111 are greater than the cross section of each of the fixing parts 223 substantially so that remaining spaces of the through holes 2111 not being occupied by the fixing parts 223 are available for fluid passing through.

Figure 4:
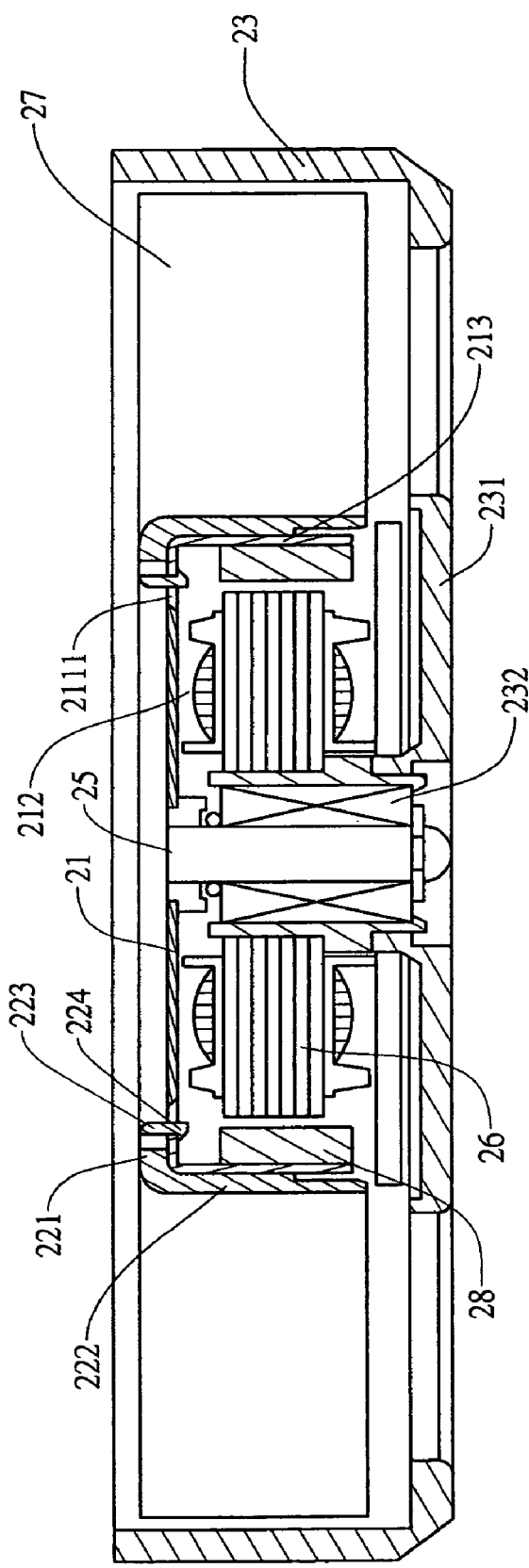
FIG. 4 is a sectional view illustrating the preferred embodiment of the present invention being applied to the rotor and stator of the motor.

Referring to FIG. 4 in company with FIGS. 2 and 3, a fan frame 23 provides a hollow support base 231 at the inner side thereof and the support base 231 provides a bearing 232 therein and a stator of the motor is attached to the support base 231. A shaft 25 is connected to the shield cover 21 at an end thereof and passes through the bearing 232 to be movably joined to the support base 231 at another end thereof. A rotor 28 of the motor is attached to the inner side of the lateral wall 213 of the shield cover 21 such that the rotor 28 and the stator 26 can constitute a magnetic connection. Once the stator 26 and the rotor 28 are magnetized to rotate the shield cover 21 and the hub 22, the fan blade set 27 is driven to rotate and move the fluid. Due to the rotor 28 and the stator 26 being magnetized to rotate, the generated magnetic force physically changes to heat to result in temperature rise of the fluid in the chamber 212 of the shield cover 21. Under this circumstance, the heat can transmit to the shield cover 21 and then to the open air via the exposed closed end 211 by way of natural convection and the temperature rose fluid can move outward via the through holes 2111 at the closed end 211. In this way, the heat between the rotor 28 and the stator 26 can be dissipated largely and the life span of the motor can prolong effectively.

It is noted that adhesives can be used for joining the hub 22 with the shield cover 21.

While the invention has been described with referencing to preferred embodiments thereof, it is to be understood that modifications or variations may be easily made without departing from the spirit of this invention, which is defined by the appended claims.

What is claimed is:

1. A rotor assembly capable of dissipating heat, comprising:
   a shied cover, providing a closed end and an open end, frame; having a lateral wall being joined to the closed end and having at least a through hole at the closed end; and
   a hub, providing at least a fixing part penetrating the through hole such that the hub can be attached to the outer surface of the shield cover;
   whereby, fluid can move in and out via the through holes to enhance convection efficiency and promote heat dissipation effectively.

2. The rotor assembly capable of dissipating heat as defined in claim 1, wherein the closed end is the top wall of the shield cover.

3. The rotor assembly capable of dissipating heat as defined in claim 1, wherein the fixing part of the hub has a hook-engaging part.

4. The rotor assembly capable of dissipating heat as defined in claim 1, wherein the hub can be attached to the shield cover with adhesives.

5. The rotor assembly capable of dissipating heat as defined in claim 1, wherein the through hole is greater than the fixing part substantially.

6. The rotor assembly capable of dissipating heat as defined in claim 1, wherein the shield cover is made of good conductive material.

7. The rotor assembly capable of dissipating heat as defined in claim 6, wherein the good conductive material is metal.

8. The rotor assembly capable of dissipating heat as defined in claim 1, wherein the through hole provides a slant inner wall.

* * * * *